United States Patent
Sola et al.

(10) Patent No.: US 6,813,380 B1
(45) Date of Patent: Nov. 2, 2004

(54) METHOD OF DETERMINING HYPERSPECTRAL LINE PAIRS FOR TARGET DETECTION

(75) Inventors: Marcos C. Sola, Fort Washington, MD (US); Steven Kovel, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 673 days.

(21) Appl. No.: 09/928,750

(22) Filed: Aug. 14, 2001

(51) Int. Cl.[7] .............................. G06K 9/46; G06K 9/68; G06K 9/00

(52) U.S. Cl. ...................... 382/191; 382/203; 382/218; 382/170

(58) Field of Search ................................ 382/190, 191, 382/195, 199, 203, 209, 217, 218, 170, 103, 260; 356/303; 359/285

(56) References Cited

U.S. PATENT DOCUMENTS 6,282,301 B1 * 8/2001 Haskett ...................... 382/103
6,490,075 B1 * 12/2002 Scheps et al. ............... 359/285
6,529,614 B1 * 3/2003 Chao et al. .................. 382/103
6,751,359 B1 * 6/2004 Handley ...................... 382/260
2002/0015151 A1 * 2/2002 Gorin .......................... 356/303

OTHER PUBLICATIONS

1998 Thesis Abstract; United States Army, Navy, Air Force; pp. 35–53.*

* cited by examiner

Primary Examiner—Mehrdad Dastouri
(74) Attorney, Agent, or Firm—William V. Adams (57) ABSTRACT

In a target detection system two images are obtained of a known target, using two different wavelength filters constituting a hyperspectral line pair. The images are subtracted and the resulting image is analyzed by creating a Y profile of pixel values along a vertical line through the target on the image, and creating an X profile of pixel values along a horizontal line through the target on the image. Values of peak signal, peak noise and mean noise are obtained for each profile. These values are used to test certain criteria, which if not met, results in the selection of a new hyperspectral line pair for analysis. If the criteria are met for a first tested profile, then the tests are applied to the second profile. If the analyses of both profiles meet the criteria, then that hyperspectral line pair being tested is stored as a candidate for future use in target detection.

6 Claims, 8 Drawing Sheets

METHOD OF DETERMINING HYPERSPECTRAL LINE PAIRS FOR TARGET DETECTION

STATEMENT OF GOVERNMENT INTEREST

The invention described herein may be manufactured and used by or for the Government of the United States of America for government purposes without the payment of any royalties therefor.

BACKGROUND OF THE INVENTION

A known procedure for target detection involves hyperspectral line pairs wherein two images of the same target area are obtained using two different filters of different wavelengths. With the correct selection of filters, the images may be subtracted, resulting in an enhanced target signature.

By predetermining hyperspectral lines, or wavelengths, which will be interrogated for a target of interest under known battlefield conditions, it would be possible to decrease the computational burden associated with data acquisition utilizing a hyperspectral sensor imager. The present invention provides a method for meeting this objective.

SUMMARY OF THE INVENTION

The method of the present invention determines hyperspectral line pairs which will indicate a target of interest in a target area. Images are taken of a known target in a target area through two different wavelength filters, constituting a hyperspectral line pair, and the obtained images are subtracted, yielding a resultant image. Values are obtained of pixels of the resultant image along vertical and horizontal lines which pass through the target to obtain Y and X profiles of pixel values.

A first of the profiles is analyzed to extract peak signal, peak noise and mean noise values within the profile and these are examined to see if a predetermined relationship exists between these values. If not, a new hyperspectral line pair is selected to obtain a new resultant image for analysis. If the relationship does exist, first and second user defined metrics are created, relating to the difference in predetermined ones of the peak signal, peak noise and mean noise values.

The first and second user defined metrics are tested to see if both exceed predetermined respective first and second thresholds, and if not, a new hyperspectral line pair is selected to obtain a new resultant image for analysis. If both the thresholds are exceeded, a third metric is created which is a ratio of the first and second metrics.

This third metric is tested to see if it exceeds a predetermined third threshold, and if not, a new hyperspectral line pair is selected to obtain a new resultant image for analysis, and if the third threshold is exceeded, the above steps are performed on the second of the profiles. Hyperspectral line pairs which result in the third threshold being exceeded for both the Y and X profile analysis are selected as candidates for positive target detection, with the potential for target identification.

BRIEF DESCRIPTION OF THE DRAWINGS

The invention will be better understood, and further objects, features and advantages thereof will become more apparent from the following description of the preferred embodiment, taken in conjunction with the accompanying drawings, in which.

DETAILED DESCRIPTION OF THE PREFERRED EMBODIMENTS

In the drawings, which are not necessarily to scale, like or corresponding parts are denoted by like or corresponding reference numerals.

Figure 1:
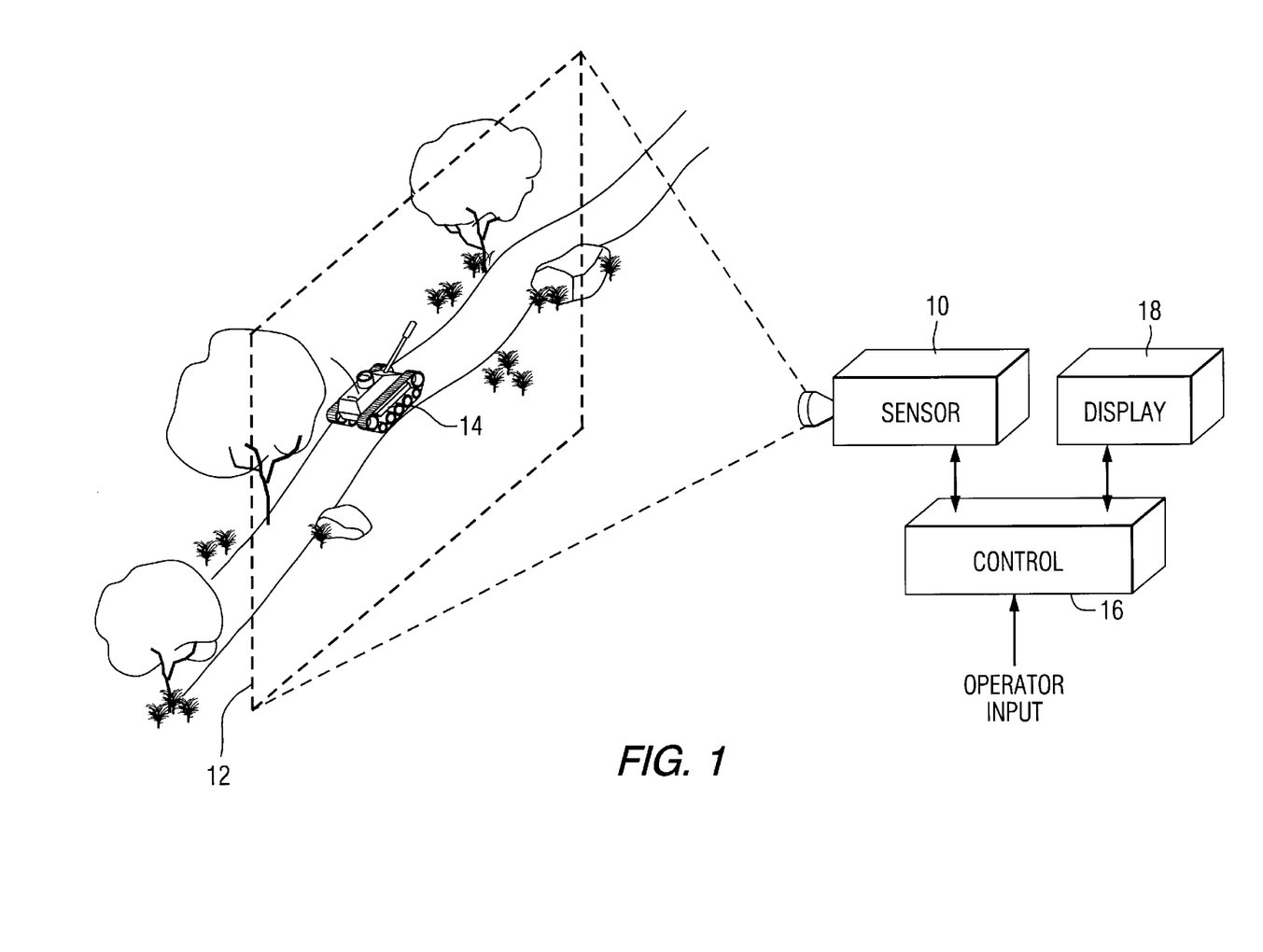
FIG. 1 is a block diagram of apparatus for obtaining images of a target area.

In FIG. 1, a sensor 10 views a target area of interest 12, which includes a known target 14. Sensor 10 is a hyperspectral sensor imager of the type which can obtain images filtered by selected wavelengths. One example of such sensor 10 is an acousto-optical tunable filter camera, the filter function of which is governed by control unit 16, which controls the selection of n filters of different wavelengths, where n may be between 100 and 200, by way of example. Various other types of such sensors may also be used for obtaining images at preselected wavelengths.

Each image obtained with a particular wavelength filter is stored in control unit 16 and is available for viewing by an operator on display 18. The operator inputs various commands to the control unit 16 such as selection of wavelengths, selection of display, interaction with the display and commands to compute hyperspectral line pairs. In this regard, the control unit 16 may be constituted by a PC.

Figure 2:
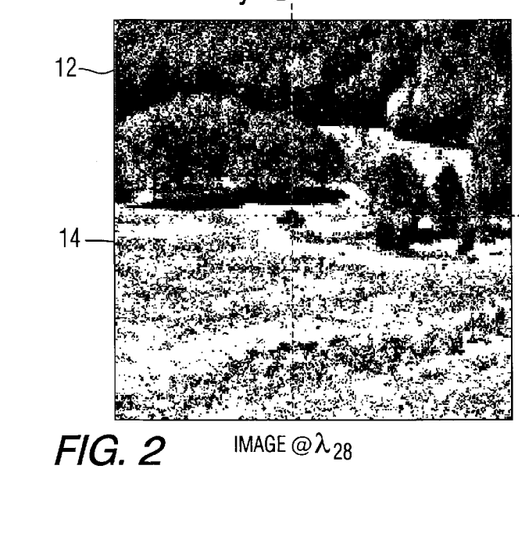
FIG. 2 illustrates a typical image derived from the apparatus of FIG. 1, utilizing a filter which transmits energy in the wavelength band around $\lambda_j$.

FIG. 2 illustrates a typical image of the target area 12, along with the target 14, in an X-Y coordinate system, obtained with a filter of wavelength $\lambda_j$, where j is one of n filters utilized by a hyperspectral sensor imager. By way of example, n may be 128, and for purposes of demonstration j=28. That is, $\lambda_j = \lambda_{28}$ representing a wavelength of 9.7108 $\mu$m (microns). The image is presented on display 18, along with crosshairs defined by vertical line y and horizontal line x. The operator positions the crosshairs over the target 14 by means of a mouse, joystick, or the like, and commands the control unit 16 to obtain spectral radiance values of each pixel along line y and along line x.

Figure 2A:
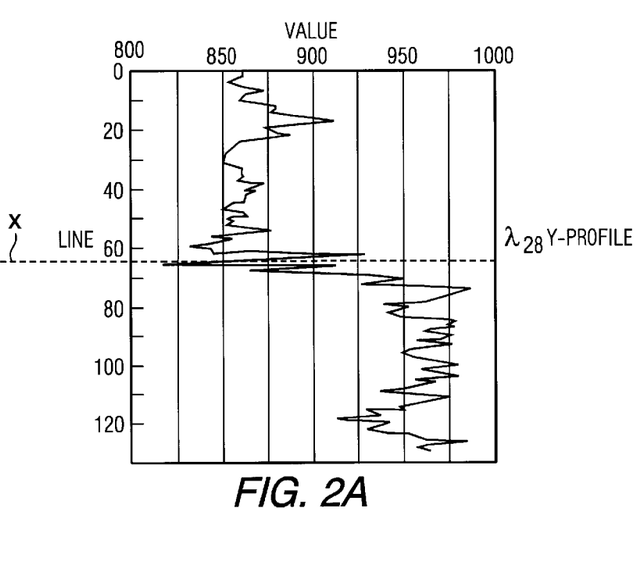
FIG. 2A is a curve of spectral radiance along a particular vertical line of FIG. 2.
Figure 2B:
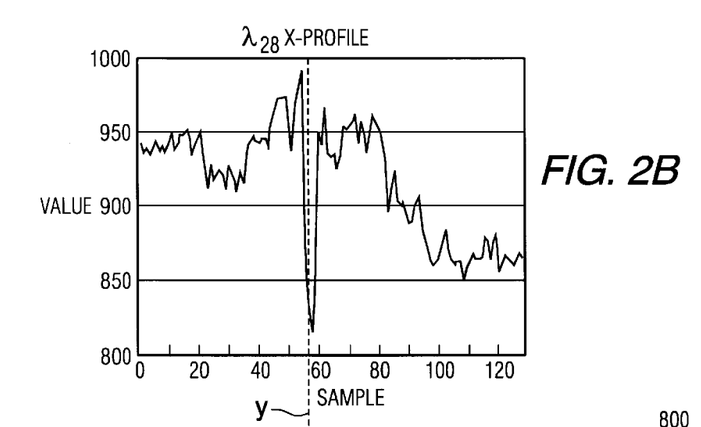
FIG. 2B is a curve of spectral radiance along a particular horizontal line of FIG. 2.

The spectral radiance values of the pixels along line y are plotted in FIG. 2A as the Y-profile wherein line x is positioned at the 64$^{th}$ pixel sample down from the top of the figure. In a like fashion, the spectral radiance values of the pixels along line x are plotted in FIG. 2B as the X-profile wherein line y is positioned at the 58$^{th}$ pixel sample from the left of the figure. An examination of FIGS. 2A and 2B illustrates that there is no special distinctness between target and background/clutter. That is, there is no distinct peak signal indicative of a target which stands out over the noise part of the signal.

Figure 3:
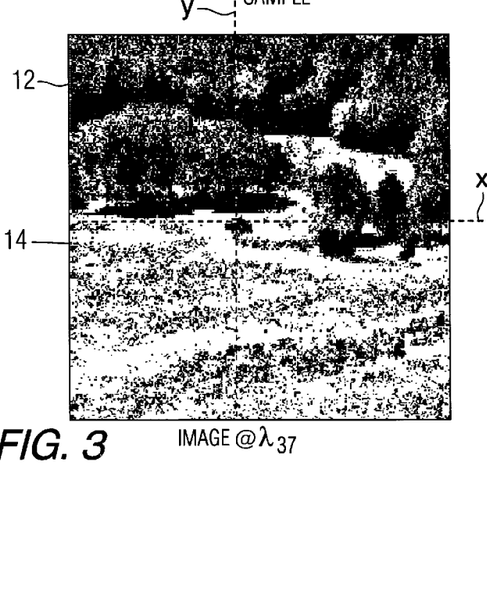
FIG. 3 illustrates a typical image derived from the apparatus of FIG. 1, utilizing a filter which transmits energy in the wavelength band around $\lambda_j$.
Figure 3A:
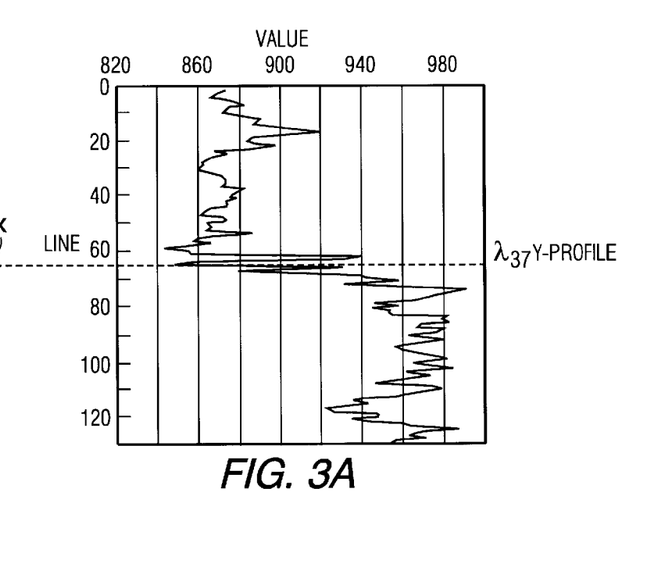
FIG. 3A is a curve of spectral radiance along a particular vertical line of FIG. 3.
Figure 3B:
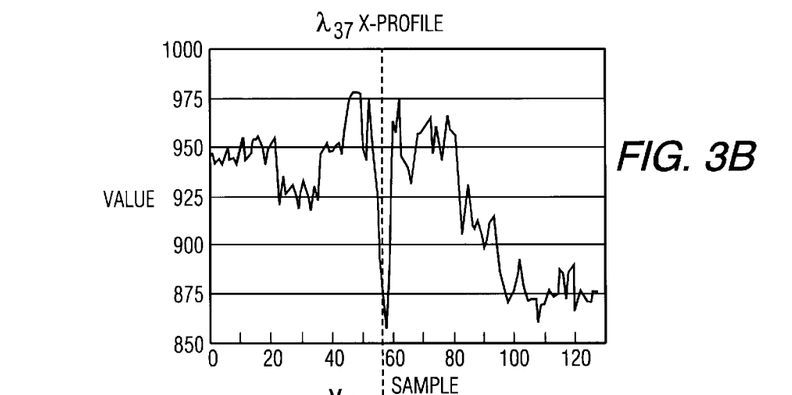
FIG. 3B is a curve of spectral radiance along a particular horizontal line of FIG. 3.

FIG. 3 illustrates an image, as in FIG. 2, however taken with a different filter, $\lambda_{37}$, where $\lambda_{37}$ represents a different wavelength of 9.2194 μm. The Y and X profiles for this image are illustrated, respectively, in FIGS. 3A and 3B. Again it is seen that these profiles do not give a clear indication of the target.

Figure 4:
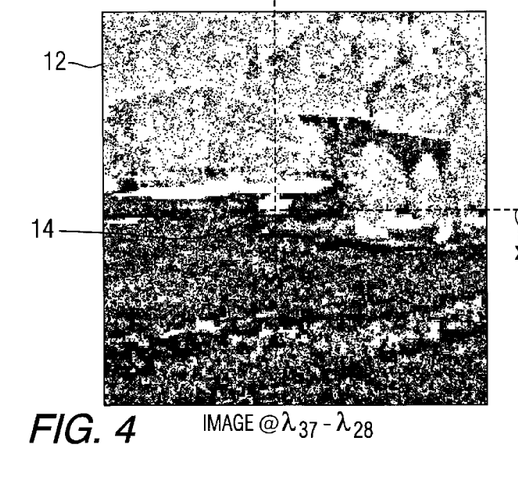
FIG. 4 illustrates the resultant image derived from the subtraction of the images of FIGS. 2 and 3.
Figure 4A:
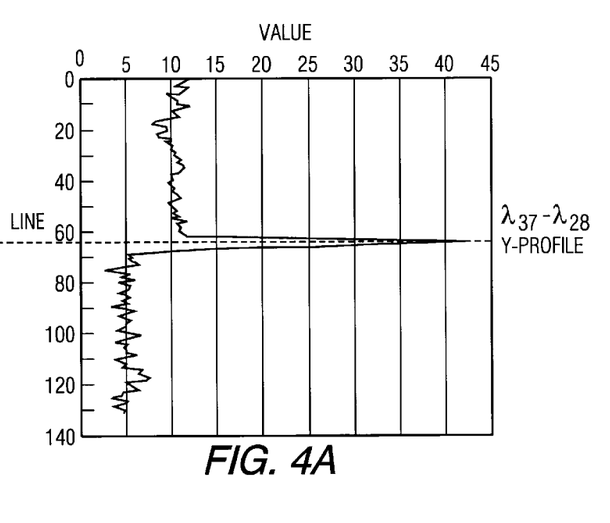
FIG. 4A is a curve of spectral radiance along a particular vertical line of FIG. 4.
Figure 4B:
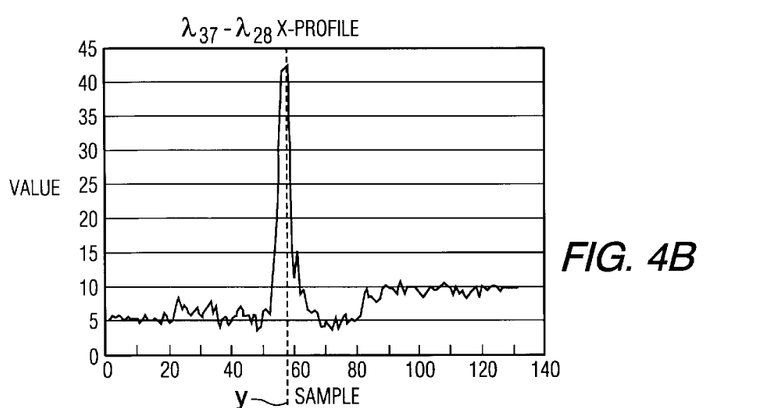
FIG. 4B is a curve of spectral radiance along a particular horizontal line of FIG. 4.

FIG. 4 is the resultant image obtained from the subtraction of the images of FIGS. 2 and 3 and it is seen that the target better stands out with respect to the background (this result of $\lambda_{37}$ minus $\lambda_{28}$ has been previously determined by experimentation). Not only may the target be better observed in FIG. 4, but the Y and X profiles of FIGS. 4A and 4B show distinct peaks over the noise at the same pixel locations as in either FIG. 2 or 3. As will be shown, in the present invention these profiles must meet certain requirements, however, before a hyperspectral line pair can be considered as defining a particular target.

Figure 5A:
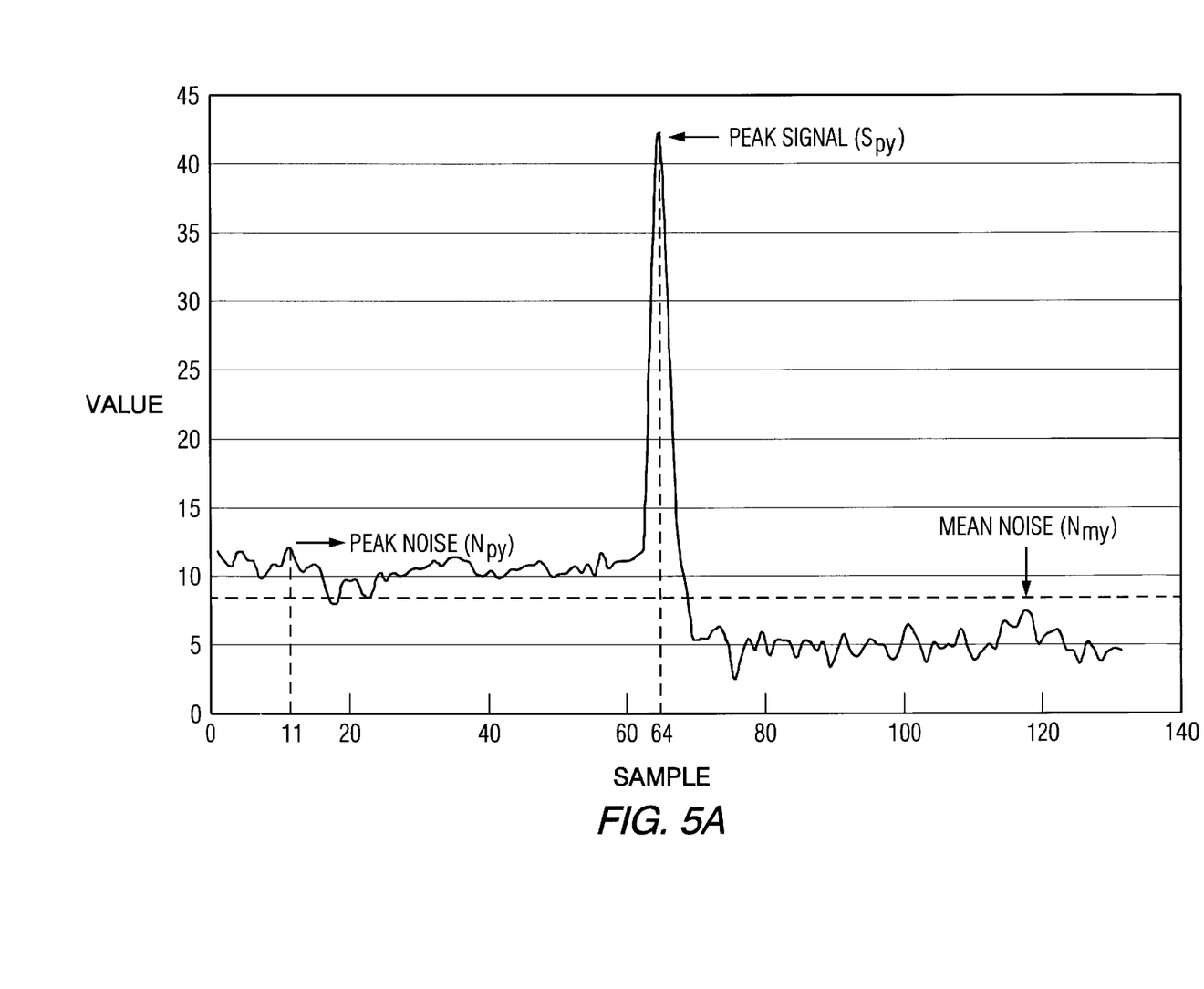
FIGS. 5A and 5B reproduce the curves of FIGS. 4A and 4B, respectively, and illustrate certain metrics utilized herein.

FIG. 5A duplicates the Y profile of FIG. 4A to illustrate certain metrics utilized herein. For convenience, the FIG. has been rotated so that the pixel sample numbers are shown on a horizontal axis and values indicative of spectral radiance are shown on a vertical axis. More particularly, the peak signal, at pixel sample 64, for the Y profile, and having a value of around 42, is designated $S_{py}$. At pixel sample 11, the peak noise, which is defined as the maximum noise in the same direction as the peak signal, and having a value of around 12, is designated $N_{py}$. The mean noise, having an average value of around 8.5, is designated $N_{my}$.

Figure 5B:
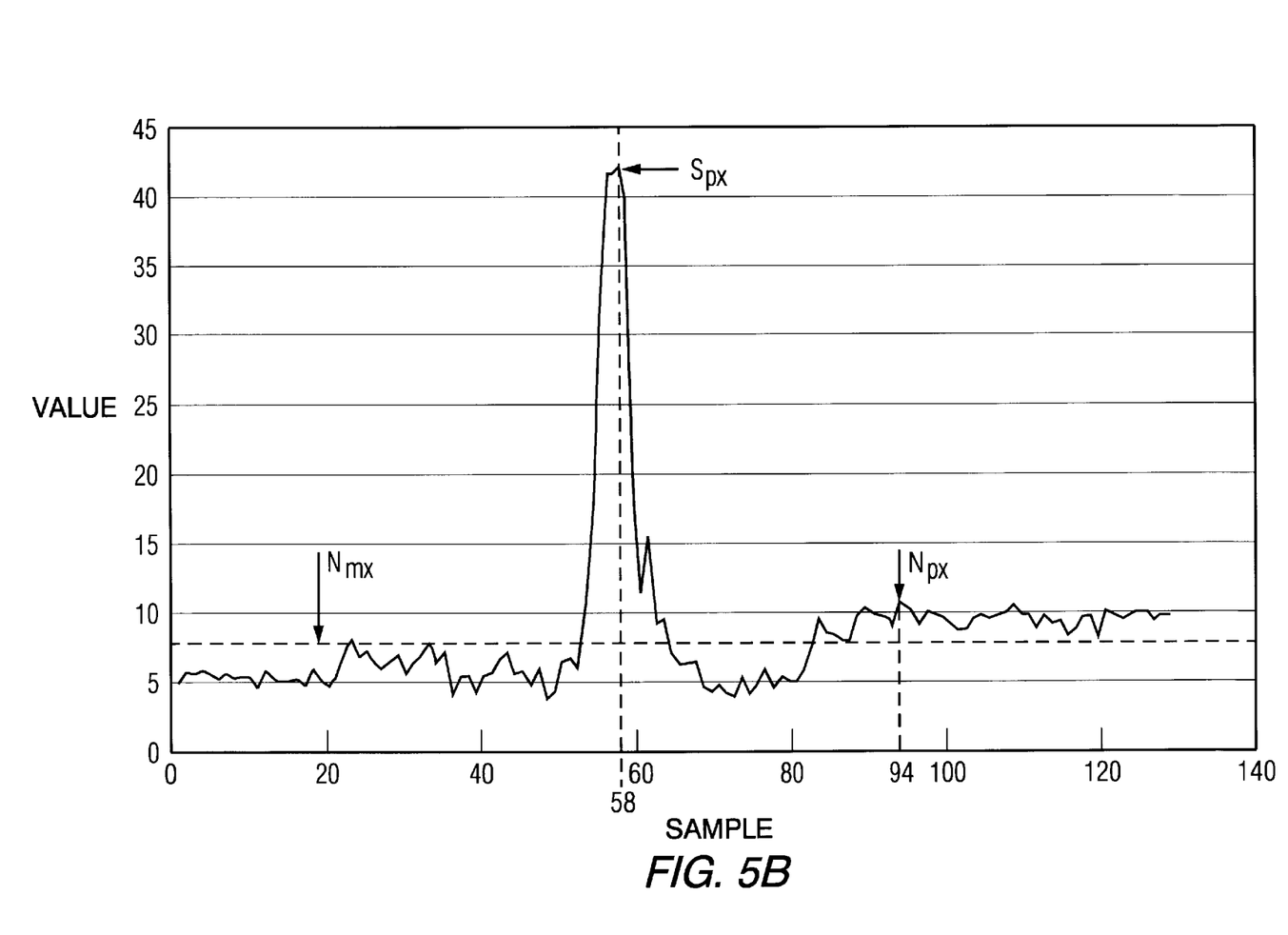

FIG. 5B duplicates the X profile of FIG. 4B and shows a peak signal $S_{px}$, at pixel 58, having a value of around 42. The peak noise $N_{px}$ at pixel 94, has a value of around 10.7, and the mean noise $N_{mx}$ has a value of around 7.2.

The method of the present invention utilizes these signal and noise values for both the X and Y profiles, in an initialization process to determine if a particular pair of hyperspectral lines result in a positive target determination. It is to be noted that more than one hyperspectral line pair can define the same target. It is believed that with a hyperspectral sensor imager, with n=128, by way of example, the computation of all possible combinations of X pairs (8,128) would take less than 30 seconds. Once having this information, the apparatus may be used under actual battlefield, or other conditions, by specifying only the particular hyperspectral line pairs gleaned from the initialization process. Once having this database of one or more correct hyperspectral line pairs for a particular target, the process may be repeated for all other available potential targets which may be encountered.

Figure 6A:
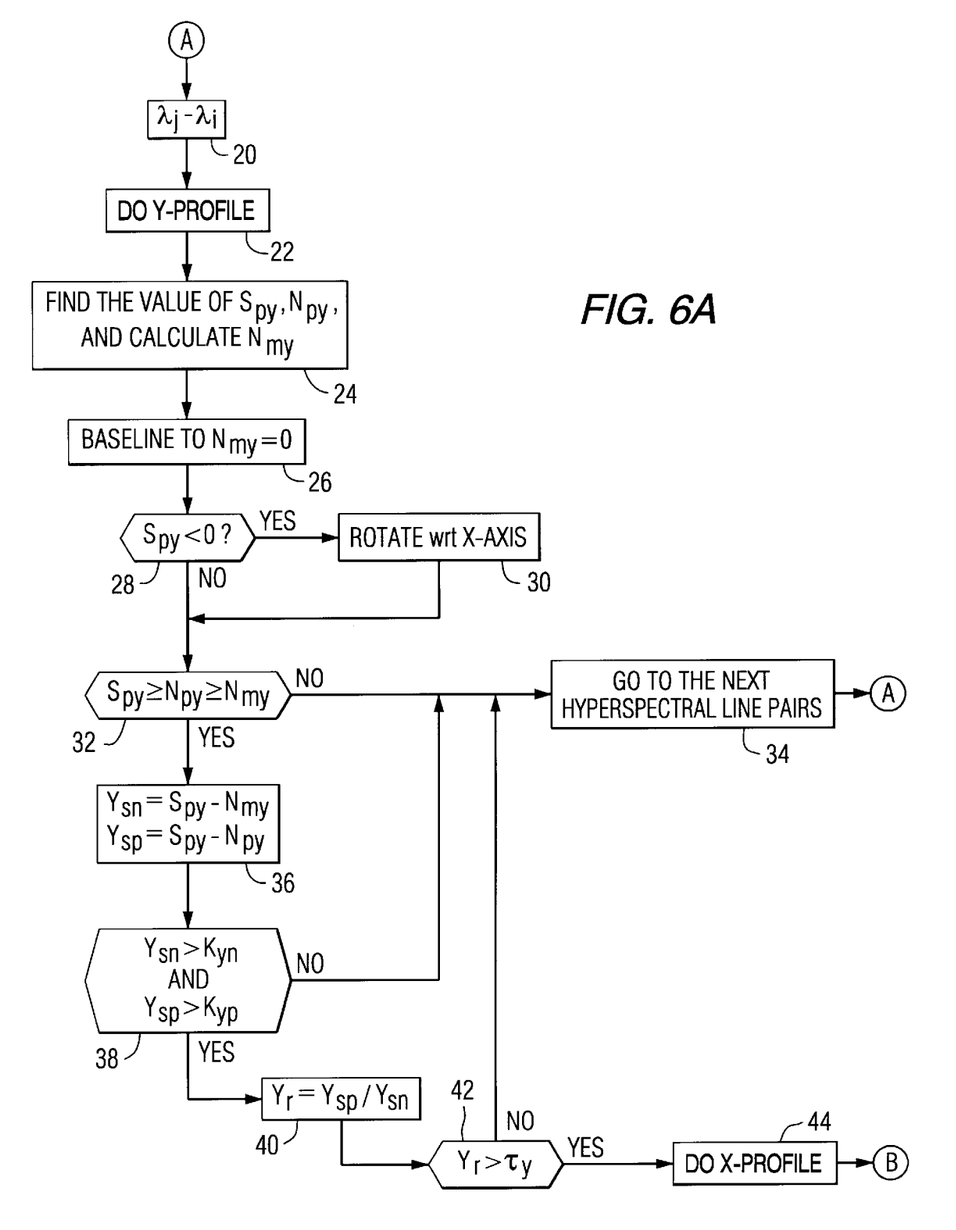
FIGS. 6A and 6B are flowcharts illustrating the operation of the present invention.
Figure 6B:
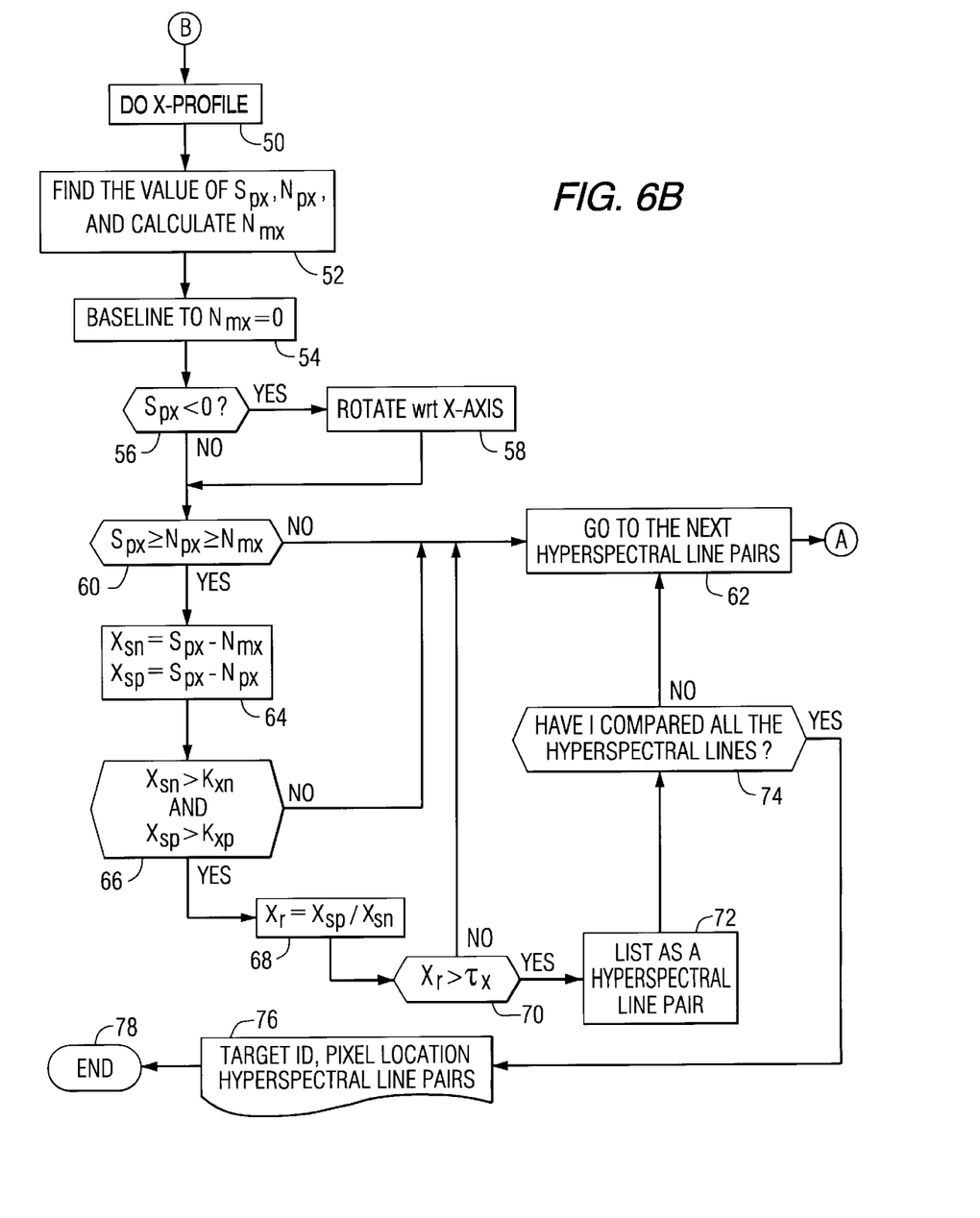

The method of determining the correct hyperspectral line pairs for a particular target is illustrated in the flowcharts of FIGS. 6A and 6B. Since the likelihood is that there would be no targets above the target of interest, in order to reduce computational time the procedure begins with the analysis of the Y profile as illustrated in FIG. 6A. At step 20 the image resulting from the insertion of filter $\lambda_i$ in the sensor is subtracted from the image from filter $\lambda_j$ and the resultant Y profile analyzation is commenced at step 22. This analysis includes, as indicated at step 24, the obtaining of values $S_{py}$, $N_{py}$ and $N_{my}$. Such analysis may be performed by commercially available software such as ENVI, a product of Research Systems of Boulder Colo.

When image subtraction is performed the relative outcome of the three metrics $S_{py}$, $N_{py}$ and $N_{my}$ can be all positive, all negative or a mixture of positive and negative values. To further save computational time, whatever the value of $N_{my}$, it is normalized to zero at step 26.

If the peak signal $S_{py}$ is negative, as interrogated at step 28, it is made positive by the rotation function of step 30, which is merely a multiplication by−1. If $S_{py}$ is positive, then step 32 is performed. Six permutations are possible from the three metrics derived in step 24. Out of these six, only the case where the peak signal $S_{py}$ is above the peak noise $N_{py}$ and the peak noise is above the mean noise $N_{my}$ is of interest, and hence a candidate for further interrogation. This determination is performed in step 32.

If the condition specified at step 32 is not met, then the next candidate wavelength pair may be examined by operation of step 34. The next pair may be selected by indexing $\lambda_j$ (or $\lambda_i$) by 1, in step 20. If the condition specified at step 32 is met, then certain user defined metrics are assigned at step 36. More particularly, a first value $Y_{sn}$ is created, where $Y_{sn}=S_{py}-N_{my}$. In the embodiment illustrated, since $N_{my}$ was baselined to zero in step 26, $Y_{sn}=S_{py}$. A second value, $Y_{sp}$ is created, where $Y_{sp}=S_{py}-N_{py}$.

These values of $Y_{sn}$ and $Y_{sp}$ are tested to see if they both are above certain predetermined threshold values. This test is performed at step 38 where $Y_{sn}$ must be above threshold $K_{yn}$ and $Y_{sp}$ must be above threshold $K_{yp}$. If both conditions are not met then a new hyperspectral line pair is tested via step 34, as previously explained.

If both conditions are met, then the ratio of $Y_{sp}/Y_{sn}$ is obtained at step 40, with the result $Y_r$ being a number between zero and 1, with the higher the value of $Y_r$ the more a target indication will stand out with respect to background/ clutter. If the value of $Y_r$, however, is not high enough, then it probably is not a good target indication. Therefore, a further test is performed at step 42 where $Y_r$ is tested to see if it is above a predetermined threshold $\tau_y$. If the test fails, then another hyperspectral line pair is tested via step 34. If, however, $Y_r$ is greater than $\tau_y$, then the hyperspectral line pair being examined is a possible candidate for target indication and, as indicated by step 44, the X profile procedure may now be performed, and to this end reference is made to FIG. 6B.

The steps of FIG. 6B are very similar to those performed for the Y profile. The X profile analyzation is commenced at step 50. This analysis includes, as indicated at step 52, the obtaining of values $S_{px}$, $N_{px}$ and $N_{mx}$ (shown in FIG. 5B) and the baselining of $N_{mx}$ to zero, at step 54. If the peak signal $S_{px}$ is negative, it is made positive by step 58.

Again, six permutations are possible from the three metrics derived in step 52 and only in the case where the peak signal $S_{px}$ is above the peak noise $N_{px}$ and the peak noise is above the mean noise $N_{mx}$ will there be further interrogation. This determination is performed in step 60. If the condition specified at step 60 is not met, then the next candidate wavelength pair is examined by operation of step 62, whereby the process reverts to the beginning, A, in FIG. 6A.

If the condition specified at step 60 is met, then, in a manner similar to step 36 of FIG. 6A, certain terms are assigned at step 64. That is, a first value $X_{sn}$ is created, where $X_{sn}=S_{px}-N_{mx}$. Since $N_{mx}$ was baselined to zero in step 54, $X_{sn}=S_{px}$. A second value $X_{sp}$ is defined, where $X_{sp}=S_{px}-N_{px}$.

These values of $X_{sn}$, and $X_{sp}$ are tested to see if they both are above certain predetermined threshold values. This test is performed at step 66 where $X_{sn}$ must be above threshold $K_{xn}$ and $X_{sp}$ must be above threshold $K_{xp}$. If both conditions are not met then a new hyperspectral line pair is tested via step 62.

If both conditions are met, then the ratio of $X_sp/X_{sn}$ is obtained at step 68, with the result $X_r$ being a number between zero and 1. $X_r$ is tested at step 70 to see if it is above a predetermined threshold $\tau_x$. If the test fails, then another hyperspectral line pair is tested via step 62. If, however, $X_r$ is greater than $\tau_x$, then the hyperspectral line pair being tested results in a good indication of the target and it is placed in a list of hyperspectral line pairs, as indicated by step 72.

At step 74 a determination is made as to whether all of the possible hyperspectral line pair combinations have been tested. If not, then the next pair is tested via step 62. If all have been tested, values of interest such as target ID, target pixel location, hyperspectral line pairs, etc. are output and/or stored for future use by operation of step 76, after which the process is ended, at step 78.

Thus, with the method of the present invention, by an initialization process, a priori determination may be made of all hyperspectral line pairs which will make a certain target stand out against background noise. With this information, target detection (with the potential for target identification) can be made essentially in real time in an actual battlefield situation. The process can be applied to all potential targets to be encountered, if such targets are available for the initialization procedure. Further, the method can be applied to a situation where special taggants are carried by a friendly target to specifically identify it. Such taggants will make the carrier strongly stand out against background noise when imaged with predetermined wavelength filters.

It will be readily seen one of ordinary skill in the art that the present invention fulfills all of the objects set forth herein. After reading the foregoing specification, one of ordinary skill in the art will be able to effect various changes, substitutions of equivalents and various other aspects of the present invention as broadly disclosed herein. It is therefore intended that the protection granted hereon be limited only by the definition contained in the appended claims and equivalents. Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. A method of determining hyperspectral line pairs which will indicate a target of interest in a target area, wherein images are taken of a known target in a target area through two different wavelength filters, constituting a hyperspectral line pair, and the obtained images are subtracted yielding a resultant image, comprising the steps of:

obtaining values of pixels of said resultant image along vertical and horizontal lines which pass through said target to obtain Y and X profiles of pixel values;

analyzing a first of said profiles to extract peak signal, peak noise and mean noise values within said profile;

determining if a predetermined relationship exists between said peak signal, peak noise and mean noise values, and if not, selecting a new hyperspectral line pair to obtain a new resultant image for analysis, and if said relationship exists, creating first and second user defined metrics relating to the difference in predetermined ones of said peak signal, peak noise and mean noise values;

testing said first and second user defined metrics to see if both exceed predetermined respective first and second thresholds, and if not, selecting a new hyperspectral line pair to obtain a new resultant image for analysis, and if both said thresholds are exceeded, creating a third metric which is a ratio of said first and second metrics;

testing said third metric to see if it exceeds a predetermined third threshold, and if not, selecting a new hyperspectral line pair to obtain a new resultant image for analysis, and if said third threshold is exceeded, performing the above steps on the second of said profiles; and recording said hyperspectral line pairs which result in said third threshold being exceeded for both the Y and X profile analysis, as candidates for future use in target identification.

2. A method according to claim 1 which includes the step of:

performing said analysis on said Y profile first.

3. A method according to claim 1 which includes the step of:

baselining said mean noise value to zero.

4. A method according to claim 1 which includes the step of:

examining said peak signal value to see if it is negative, and if so, multiplying it by −1 to make it positive.

5. A method according to claim 1 wherein:

$S_{py}$ is the peak signal, $N_{py}$ is the peak noise and $N_{my}$ is the mean noise, for the Y profile;

$S_{px}$ is the peak signal, $N_{px}$ is the peak noise and $N_{mx}$ is the mean noise, for the X profile;

said predetermined relationship for the X profile is $S_{py} \geq N_{py} \geq N_{my}$; and said predetermined relationship for the Y profile is $S_{px} \geq N_{px} \geq N_{mx}$.

6. A method according to claim 5 wherein:

said first used defined metric for said Y profile is $Y_{sn}$, where $Y_{sn}=S_{py}-N_{my}$;

said second user defined metric for said Y profile is $Y_{sp}$, where $Y_{sp}=S_{py}-N_{py}$;

said first user defined metric for said X profile is $X_{sn}$, where $X_{sn}=S_{px}-N_{mx}$; and said second user defined metric for said X profile is $X_{sp}$, where $X_{sp}=S_{px}-N_{px}$.

* * * * *